Patented Aug. 20, 1946

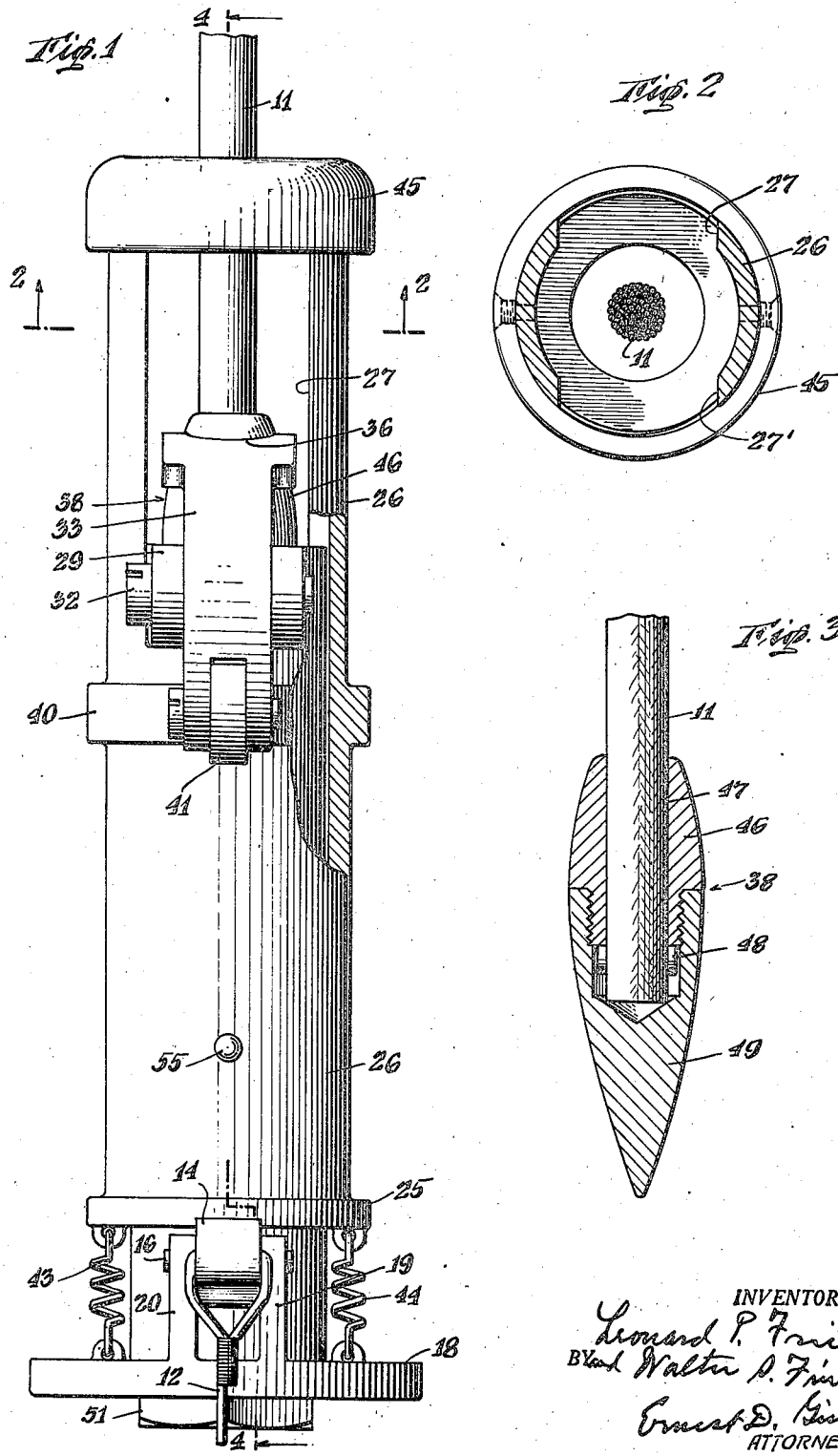

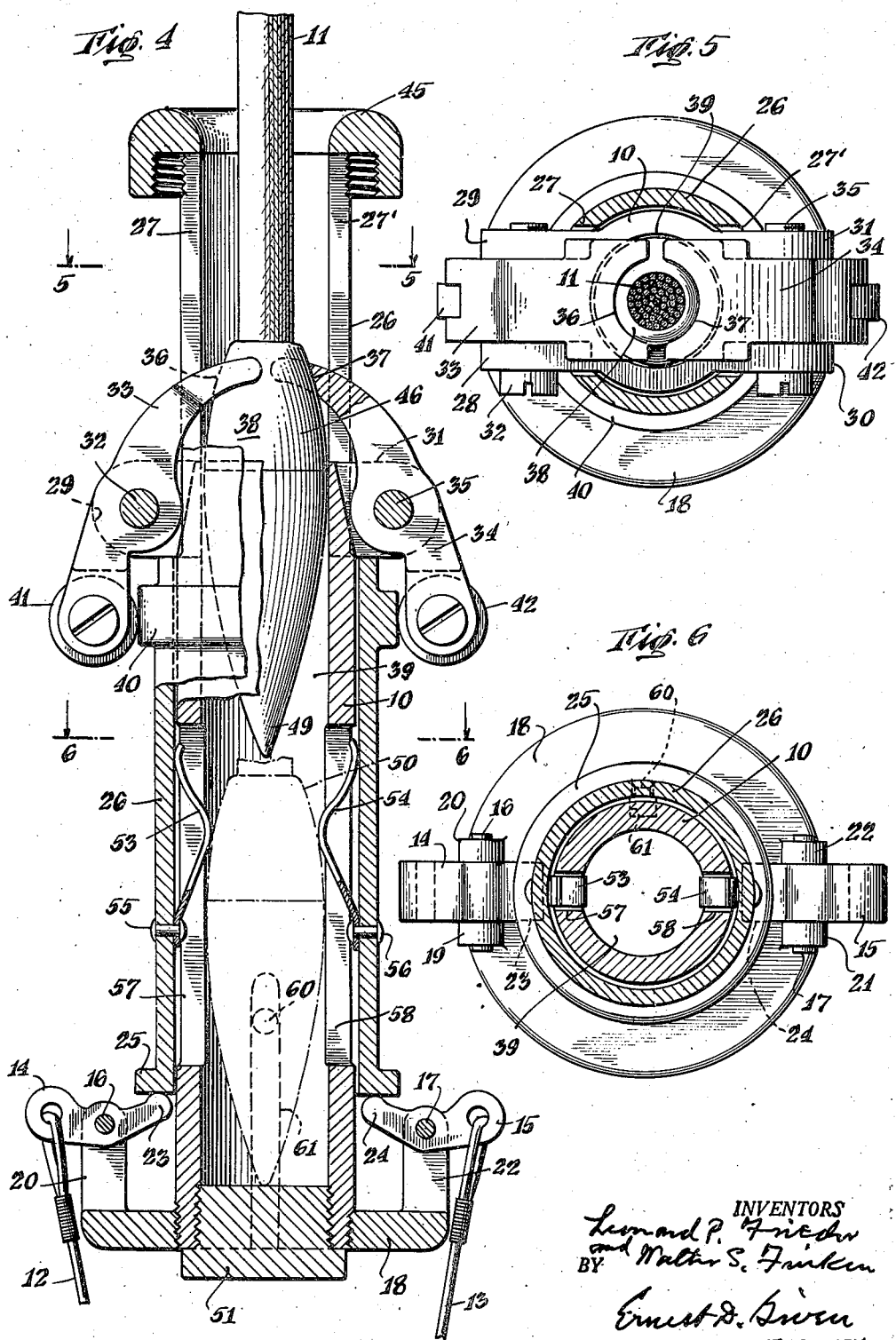

2,406,010

UNITED STATES PATENT OFFICE 2,406,010

MECHANICAL RELEASE

Leonard P. Frieder, Rockville Centre, and Walter S. Finken, Brooklyn, N. Y.; said Finken assignor to said Frieder Application March 10, 1945, Serial No. 582,126

7 Claims. (Cl. 294—83)

This invention relates to mechanical releases and it is a purpose of the invention to provide a device for supporting a load from a parachute and for effecting the release of the parachute from the load when the load alights. The device is constructed to engage a bob on a line suspended from a parachute and to support from its lower end a load which is to be landed by the parachute. The device acts as a connecting element between the parachute and the load and effects the immediate release of the parachute when the parachute is relieved of the weight of the load as the load settles upon the ground.

Other objects and advantages of the present invention appear in the following description and accompanying drawings in which the principle of the invention and the best mode of applying the same are disclosed.

Referring to the drawings,

Fig. 1 is an exterior view of the device;

Fig. 2 is a section on line 2—2 of Fig. 1;

Fig. 3 is a section through the axis of a bob;

Fig. 4 is a longitudinal view of the device on line 4—4 of Fig. 1;

Fig. 5 is a cross-section on line 5—5 of Fig. 4;

Fig. 6 is a cross-section on line 6—6 of Fig. 4.

It is desirable to effect the immediate release of a parachute as soon as the load carried by the parachute alights. In order to prevent a parachute dragging its load over the ground, the device of the present invention is so constructed as to immediately release the parachute when the descent of the parachute and load is arrested and the tension in the suspension line and through the device is thereby abruptly slackened. As shown in the drawings, the device includes a tubular member 10 which serves to connect a load to a line or cable 11 whose upper end (not shown) is secured to the shrouds of a parachute. When in use, the load is suspended from tubular member 10 by means of guys 12 and 13, such as shown in Fig. 4. These guys are secured to load-carrying means in the form of levers 14 and 15 which are pivotally mounted on pins 16 and 17, respectively. A ring 18 is fastened to the lower end of tubular member 10 and carries pairs of upstanding brackets 19, 20, and 21, 22, which respectively support pins 16 and 17. While only two guys 12 and 13 and associated levers 14 and 15 are illustrated in the drawings additional guys and levers may be employed, all performing the same function as levers 14 and 15.

When levers 14 and 15 are unrestrained by a pull upon guys 12 and 13, they are free to rotate upon their bearing pins. When a load is suspended from guys 12 and 13, the levers are held in the position shown in Figs. 1, 4 and 6, with the ends 23, 24 of the levers underlying a flange 25 at the lower end of a sleeve 26 which is carried by and has a loose sliding fit on tubular member 10. In load-suspending position the sleeve is supported at its highest position with respect to tubular member 10 by the pressure of the levers on the underside of flange 25. Sleeve 26 extends from flange 25 at its lower end to the extreme upper end of the device, and is slotted at 27 and 27' to provide passage for lugs 28, 29, 30 and 31 extending laterally from the upper end of tubular member 10. The upper limit of travel of sleeve 26 with respect to tubular member 10 is determined by the engagement of the lower horizontal edges of slots 27 and 27' with the under edges of lugs 28, 29, 30 and 31.

Lugs 28 and 29 support a bearing pin 32 on which a lever 33 is pivoted. A similar lever 34 is mounted upon bearing pin 35 which is carried by lugs 30 and 31. These levers constitute adjustably positionable means providing jaws 36, 37 for engaging and holding a bob 38. The working surfaces of the jaws are shaped complementary to the upper incurving surface of the bob and provide a metal-to-metal contact therewith and whereby withdrawal of the bob from the device in an axial direction is prevented.

When the device is in use and suspending a load from a parachute the bob is contained within the bore 39 of tubular member 10 and it is held from disengaging from the device by jaws 36 and 37. When sleeve 26 is at its uppermost position with respect to tubular member 10, as illustrated in the drawings, hub 40 underlies anti-friction rollers 41 and 42 which are rotatably mounted on pins carried by the lower arms of levers 33 and 34, respectively.

When sleeve 26 descends with respect to tubular member 10, hub 40 is removed from under rollers 41 and 42 and no longer restrains pivotal movement of levers 33 and 34. When this occurs, any pull upon line 11 causes the bob to spread apart the jaws of levers 33 and 34, with the result that the bob is withdrawn from the device and the parachute is freed. Sleeve 26 fits loosely over tubular member 10 and descends when the tension on guys 12 and 13 is released by the settling of the load suspended therefrom upon the ground.

The pull on line 11 is considerably reduced when the load being carried alights, and under ordinary conditions, sleeve 26 will slide downwardly under its own weight when the load alights and levers 14 and 15 are freed. To assure the dropping of sleeve 26 under all landing conditions, springs, such as 43 and 44, Fig. 1, are provided.

Springs 43 and 44 are connected between flange 25, at the lower end of sleeve 26, and ring 18. These springs are distended and under tension when sleeve 26 is supported by pressure from levers 14 and 15. When levers 14 and 15 are relieved from the restraint of guys 12 and 13, springs 43 and 44 draw sleeve 26 downwardly and hub 40 is removed from under rollers 41 and 42.

The end of sleeve 26 which extends upwardly beyond the end of levers 33 and 34 is provided with a ring 45 through which line 11 passes. This ring limits the permissible amount of angularity of line 11 with respect to the axis of the device for a distance beyond the jaws 36 and 37. In assembling the device the tubular member 10 is inserted within sleeve 26 from the upper end of the sleeve with lugs 28, 29 and 30, 31 entering slots 27 and 27'. Ring 45 is then screwed to the end of sleeve 26, closing off the upper ends of the slots as shown in Fig. 1. The ring may be locked in place by screws passing through the ring and engaging the sleeve, Fig. 2.

The bob constitutes an anchor for line 11 and may be made in any suitable form. Bob 38, as illustrated in Fig. 3, consists of a member 46 having a bore 47 through which the end of the line 11 passes. The line is looped around a pin 48 whose ends engage the lower end of member 46. A bullet-shaped cap 49 has a threaded recess which engages a threaded neck on member 46 and encloses the loop at the end of the line and at the same time prevents displacement of pin 48 axially of itself to prevent its disengagement from the line.

The maximum girth of the bob is such that the bob is slidable lengthwise of the bore 39 of tubular member 10 so that it can be moved within the bore from its position of engagement with levers 33 and 34 to the lower end of the bore as shown at 50. The lower end of bore 39 is closed by stop 51 which determines the lowest possible position of the bob within the bore.

When the device is stowed or is being handled preparatory to use and before the guys 12 and 13 are attached thereto, or, if attached before any pull is exerted on the guys, sleeve 26 may be held in position to underlie rollers 41 and 42 whereby levers 33 and 34 are locked in position to prevent withdrawal of the bob from the device. This is accomplished by the coaction of springs 53 and 54 and bob 38 when the latter is located in position 50 at the lower end of the device, Fig. 4. Springs 53 and 54 are attached to sleeve 26 by rivets 55 and 56 which respectively pass through the lower ends of the springs. The springs extend inwardly of bore 39 through slots 57 and 58 in the wall of tubular member 10.

Springs 53 and 54 are so located on sleeve 26 that when the sleeve is in lever-locking position, as shown in Figs. 1 and 4, and before a load is suspended, the springs act against the inwardly sloping surface at the top of the bob when the bob is at rest against stop 51. The effect of springs 53 and 54 on sleeve 26 for holding the sleeve in lever-locking position is greater than the tendency of springs 43 and 44 to draw the sleeve in the reverse direction.

When the load to be dropped is released from an airplane and tension is applied to guys 12 and 13, levers 14 and 15 immediately come into action to hold sleeve 26 in its uppermost position and levers 33 and 34 closed. The pull on guys 12 and 13 effects rotation of levers 14 and 15 about their pivots until they are stopped with their arms 23 and 24 in contact with the underside of flange 25, as shown in Fig. 4. The effect of the pull on the guys is thereby transmitted to sleeve 26 and tubular member 10, whereupon the bob is pulled free of springs 53 and 54 and brought into contact with jaws 36 and 37 by which the bob is held during suspension of the load from the guys. Contracting movement of retrieving springs 43 and 44 is prevented by the support afforded sleeve 26 through levers 14 and 15 when the guys are tensioned.

Stud 60, carried by sleeve 26, extends into groove 61 in tubular member 10 and prevents rotation between the sleeve and the tubular member.

In addition to suspending a load from a parachute and effecting release of the parachute the device has other applications as for releasing loads from a crane cable on marine or land operations when the use of conventional trip lines is not practicable.

While a preferred form of device has been described, it is understood that the invention is susceptible of embodiment in other modifications coming within the scope of the claims which follow.

What is claimed is:

1. In a device of the character described, the combination comprising a bob and a bored member for connecting a load to a suspension line, operable arms pivotally mounted on said member and having jaws for engaging a bob located in the bore of said member and fastened to a suspension line, a sleeve slidable over said member and adapted to hold said arms in bob-engaging position, and displaceable means mounted on said member and operable by a load attached thereto to hold said sleeve in position on said member for engaging said arms and to be displaced from said position under the action of said sleeve when the force of the load thereon is relieved.

2. In a device of the character described, the combination comprising a tubular member having load-carrying means thereon whereby one end of said member may be attached to a load, a bob within said tubular member, a sleeve slidable along said tubular member and engageable by said load-carrying means for holding said sleeve in a predetermined position with respect to said tubular member, adjustably positionable means carried by said tubular member and provided with jaws for engaging said bob within said tubular member, said sleeve being adapted to engage said adjustably positionable means to hold said jaws in bob-engaging position when said sleeve is in said predetermined position and to descend to release said adjustably positionable means when released by said load-carrying means, whereby, when restraint on said load-carrying means is removed, said sleeve descends and releases said jaws from bob-engaging position.

3. In a device of the character described, the combination comprising a tubular member and a sleeve adapted to slide with respect to each other, pivoted levers mounted on said tubular member and having means for supporting a load, a bob, adjustably positionable means mounted upon the other end of said tubular member and having jaws for engaging said bob, said sleeve being adapted to hold the jaws of said adjustably positionable means in bob-engaging position when it is held in its highest position with respect to said tubular member by the restraining effort of said pivoted levers and to be released from said position upon discontinuance of the effect of a load on said levers.

4. In a device of the class described, the combination comprising a tubular member and an outside sleeve slidable with respect to each other, the sleeve having a portion extending beyond one end of said tubular member, means coacting between said tubular member and sleeve for limiting the sliding movement of said sleeve with respect to said tubular member, a bob extending within said tubular member, a pair of levers pivotally mounted opposite each other on said tubular member and said levers having arms movable through openings in said sleeve and jaws on said arms movable towards and away from each other as the levers are pivoted, means on said sleeve for holding said jaws towards each other in bob-engaging position when said sleeve is at the limit of its upward travel with respect to said tubular member, and means cooperating between said tubular member and said sleeve for holding said sleeve in its uppermost position with respect to said tubular member.

5. In a device of the character described, the combination comprising a bored member for connecting a load to a suspension line, adjustably positionable means mounted on said member and having jaws movable to project inwards and over one end of the bore of said bored member, a bob slidable in the bore of said member and adapted to be held therein by said jaws, a stop within said bore for limiting the travel of said bob a predetermined distance away from said jaws, a sleeve slidable over said bored member, spring means carried by said sleeve and extending through slots in said bored member and into the bore of said member, said spring means being adapted to hold said bob against said stop and said sleeve in engaging relationship with said adjustably positionable means, and displaceable means for attachment of a load, said displaceable means being carried by said bored member and adapted to cooperate with said sleeve.

6. In a device of the character described, the combination comprising a tubular member and a sleeve adapted to slide with respect to each other, pivoted levers mounted on said tubular member and having means for supporting a load, a bob, adjustably positionable means mounted upon the other end of said tubular member and having jaws for engaging said bob, said sleeve being adapted to hold the jaws of said adjustably positionable means in bob-engaging position when it is held in its highest position with respect to said tubular member by the restraining effort of said pivoted levers and to be released from said position upon discontinuance of the effect of a load on said levers, and means for sliding said sleeve along said tubular member and away from its position of influence over said adjustably positionable means when said pivoted levers are relieved of their load, said means being attached between said sleeve and said tubular member.

7. In a device of the character described, the combination comprising a bored member for connecting a load to a suspension line, adjustably positionable means mounted on said member and having jaws movable to project inwards and over one end of the bore of said bored member, a bob slidable in the bore of said member and adapted to be held therein by said jaws, a stop within said bore for limiting the travel of said bob a predetermined distance away from said jaws, a sleeve slidable over said bored member, spring means carried by said sleeve and extending through slots in said bored member and into the bore of said member, said spring means being adapted to hold said bob against said stop and said sleeve in engaging relationship with said adjustably positionable means, displaceable means for attachment of a load, said displaceable means being carried by said bored member and adapted to cooperate with said sleeve for holding said sleeve in position to lock the jaws of said adjustably positionable means in bob-engaging position, and springs attached to said sleeve and to said bored member to draw said sleeve from its jaw-locking position when said displaceable means is relieved of its load.

LEONARD P. FRIEDER.
WALTER S. FINKEN.